United States Patent
Gregori et al.

(10) Patent No.: US 11,179,706 B2
(45) Date of Patent: Nov. 23, 2021

(54) LEAN NO$_x$ TRAP CATALYST

(71) Applicant: JOHNSON MATTHEY PUBLIC LIMITED COMPANY, London (GB)

(72) Inventors: Gregory Gregori, Royston (GB); Paul Phillips, Royston (GB); Julian Pritzwald-Stegmann, Wayne, PA (US); Stuart David Reid, Royston (GB); Wolfgang Strehlau, Sulzbach (DE)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/810,913

(22) Filed: Mar. 6, 2020

(65) Prior Publication Data
US 2020/0282385 A1 Sep. 10, 2020

(30) Foreign Application Priority Data
Mar. 6, 2019 (GB) ..................................... 1903006

(51) Int. Cl.
| | | |
|---|---|---|
| *B01J 29/74* | (2006.01) | |
| *B01J 23/10* | (2006.01) | |
| *B01J 21/04* | (2006.01) | |
| *B01J 23/44* | (2006.01) | |
| *B01J 35/00* | (2006.01) | |
| *B01J 35/04* | (2006.01) | |
| *B01D 53/94* | (2006.01) | |
| *F01N 3/28* | (2006.01) | |
| *F01N 3/20* | (2006.01) | |
| *F01N 3/08* | (2006.01) | |
| *F01N 3/10* | (2006.01) | |

(52) U.S. Cl.
CPC ........ *B01J 29/7415* (2013.01); *B01D 53/944* (2013.01); *B01D 53/9422* (2013.01); *B01D 53/9468* (2013.01); *B01D 53/9472* (2013.01); *B01J 21/04* (2013.01); *B01J 23/10* (2013.01); *B01J 23/44* (2013.01); *B01J 35/0006* (2013.01); *B01J 35/0066* (2013.01); *B01J 35/04* (2013.01); *F01N 3/0814* (2013.01); *F01N 3/0821* (2013.01); *F01N 3/0842* (2013.01); *F01N 3/2066* (2013.01); *F01N 3/2803* (2013.01); *B01D 2255/1021* (2013.01); *B01D 2255/1023* (2013.01); *B01D 2255/2042* (2013.01); *B01D 2255/2065* (2013.01); *B01D 2255/2068* (2013.01); *B01D 2255/502* (2013.01); *B01D 2255/9022* (2013.01); *B01D 2255/9032* (2013.01); *B01D 2255/91* (2013.01); *B01D 2255/9155* (2013.01); *F01N 3/101* (2013.01); *F01N 2330/30* (2013.01); *F01N 2370/04* (2013.01); *F01N 2570/14* (2013.01)

(58) Field of Classification Search
CPC ............ B01D 53/9413; B01D 53/9418; B01D 53/9422; B01D 53/9427; B01D 53/944; B01D 53/945; B01D 53/9468; B01D 53/9472; B01D 2255/102; B01D 2255/902; B01D 2255/903; B01D 2255/91; B01D 2258/012; F01N 3/0842; F01N 3/103; F01N 3/105; F01N 3/20; F01N 2240/18; F01N 2250/12; F01N 2570/14

See application file for complete search history.

(56) References Cited

U.S. PATENT DOCUMENTS

| | | | |
|---|---|---|---|
| 6,753,294 B1 * | 6/2004 | Brisley | F01N 3/0231 502/439 |
| 9,828,896 B2 * | 11/2017 | Swallow | B01J 23/63 |
| 2012/0110988 A1 * | 5/2012 | Dotzel | C04B 38/0006 60/299 |
| 2015/0336085 A1 | 11/2015 | Hoyer et al. | |
| 2017/0106337 A1 | 4/2017 | Chiffey et al. | |
| 2017/0320046 A1 | 11/2017 | Armitage et al. | |
| 2017/0356371 A1 | 12/2017 | Armitage et al. | |
| 2018/0056239 A1 | 3/2018 | Feaviour et al. | |
| 2018/0056278 A1 | 3/2018 | Feaviour et al. | |
| 2018/0066554 A1 | 3/2018 | Phillips et al. | |
| 2019/0351393 A1 * | 11/2019 | Nunan | B01J 29/40 |

FOREIGN PATENT DOCUMENTS

| | | |
|---|---|---|
| EP | 1027919 A1 | 8/2000 |
| GB | 2560925 A | 5/2017 |
| WO | 2004076829 A1 | 9/2004 |

* cited by examiner

Primary Examiner — Timothy C Vanoy

(57) ABSTRACT

A lean NO$_x$ trap catalyst and its use in an emission treatment system for internal combustion engines is disclosed. The lean NO$_x$ trap catalyst comprises a first layer for storing nitrogen oxides (NOx) under lean exhaust gas conditions and releasing and/or reducing stored NOx during rich exhaust gas conditions, and a second layer, said second layer comprising a first zone for oxidizing carbon monoxide (CO) and/or hydrocarbons (HC), and a second zone for oxidizing nitric oxide (NO), and a substrate having an inlet end and an outlet end.

27 Claims, 1 Drawing Sheet

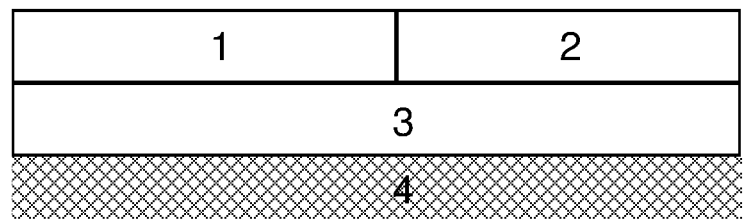

LEAN NO$_x$ TRAP CATALYST

FIELD OF THE INVENTION

The invention relates to a lean NO$_x$ trap catalyst, a method of treating an exhaust gas from an internal combustion engine, and emission systems for internal combustion engines comprising the lean NO$_x$ trap catalyst.

BACKGROUND OF THE INVENTION

Internal combustion engines produce exhaust gases containing a variety of pollutants, including nitrogen oxides ("NO$_x$"), carbon monoxide, and uncombusted hydrocarbons, which are the subject of governmental legislation. Increasingly stringent national and regional legislation has lowered the amount of pollutants that can be emitted from such diesel or gasoline engines. Emission control systems are widely utilized to reduce the amount of these pollutants emitted to atmosphere, and typically achieve very high efficiencies once they reach their operating temperature (typically, 200° C. and higher).

One exhaust gas treatment component utilized to clean exhaust gas is the lean NO$_x$ trap catalyst (LNT), also referred to in the art as the NO$_x$ adsorber catalyst (NAC). NO$_x$ adsorber catalysts are devices that adsorb NO$_x$ under lean exhaust conditions, release the adsorbed NO$_x$ under rich conditions, and reduce the released NO$_x$ to form N$_2$. A NO$_x$ adsorber catalyst typically includes a NO$_x$ adsorbent for the storage of NO$_x$ and an oxidation/reduction catalyst.

The NO$_x$ adsorbent component is typically an alkaline earth metal, an alkali metal, a rare earth metal, or combinations thereof. These metals are typically found in the form of oxides. The oxidation/reduction catalyst is typically one or more noble metals, preferably platinum, palladium, and/or rhodium. Typically, platinum is included to perform the oxidation function and rhodium is included to perform the reduction function. The oxidation/reduction catalyst and the NO$_x$ adsorbent are typically loaded on a support material such as an inorganic oxide for use in the exhaust system.

The NO$_x$ adsorber catalyst performs three functions. First, nitric oxide reacts with oxygen to produce NO$_2$ in the presence of the oxidation catalyst. Second, the NO$_2$ is adsorbed by the NO$_x$ adsorbent in the form of an inorganic nitrate (for example, BaO or BaCO$_3$ is converted to Ba(NO$_3$)$_2$ on the NO$_x$ adsorbent). Lastly, when the engine runs under rich conditions, the stored inorganic nitrates decompose to form NO or NO$_2$ which are then reduced to form N$_2$ by reaction with carbon monoxide, hydrogen and/or hydrocarbons (or via NH$_x$ or NCO intermediates) in the presence of the reduction catalyst. Typically, the nitrogen oxides are converted to nitrogen, carbon dioxide and water in the presence of heat, carbon monoxide, hydrogen and hydrocarbons in the exhaust stream.

PCT Intl. Appl. WO 2004/076829 discloses an exhaust-gas purification system which includes a NO$_x$ storage catalyst arranged upstream of an SCR catalyst. The NO$_x$ storage catalyst includes at least one alkali, alkaline earth, or rare earth metal which is coated or activated with at least one platinum group metal (Pt, Pd, Rh, or Ir). A particularly preferred NO$_x$ storage catalyst is taught to include cerium oxide coated with platinum and additionally platinum as an oxidizing catalyst on a support based on aluminium oxide. EP 1027919 discloses a NO$_x$ adsorbent material that comprises a porous support material, such as alumina, zeolite, zirconia, titania, and/or lanthana, and at least 0.1 wt % precious metal (Pt, Pd, and/or Rh). Platinum carried on alumina is exemplified.

US 2015/0336085 describes a nitrogen oxide storage catalyst composed of at least two catalytically active coatings on a support body. The lower coating contains cerium oxide and platinum and/or palladium. The upper coating, which is disposed above the lower coating, contains an alkaline earth metal compound, a mixed oxide, and platinum and palladium. The nitrogen oxide storage catalyst is said to be particularly suitable for the conversion of NO$_x$ in exhaust gases from a lean burn engine, e.g. a diesel engine, at temperatures of between 200 and 500° C.

Although the primary function of the lean NOx trap catalyst is to control NOx emissions, the presence of noble metals or platinum group metals means that they may also have the additional functionality of oxidizing other exhaust gas components, such as hydrocarbons and carbon monoxide. A multifunctional catalyst of this type may be desirable in systems where it is advantageous to reduce the number of discrete exhaust gas catalysts. In addition, the noble metals or platinum group metals used in lean NOx trap catalysts are expensive, and hence it is desirable for these materials to be utilized as effectively as possible in treating exhaust gas emissions. Alternatively, reducing the amount of these expensive materials (known as "thrifting") is desirable as a means to reduce the costs associated with these catalysts.

As with any automotive system and process, it is desirable to attain still further improvements in exhaust gas treatment systems. We have discovered a new NO$_x$ adsorber catalyst composition with improved CO oxidation activity. It has surprisingly been found that these improved catalyst characteristics are achievable without increasing the amount of noble or platinum group metals required.

SUMMARY OF THE INVENTION

In a first aspect of the invention there is provided a lean NOx trap catalyst, comprising:

a first layer for storing nitrogen oxides (NOx) under lean exhaust gas conditions and releasing and/or reducing stored NOx during rich exhaust gas conditions, said first layer comprising one or more platinum group metals, a NOx storage material, and a first inorganic oxide;

a second layer disposed on the first layer, said second layer comprising a first zone for oxidizing carbon monoxide (CO) and/or hydrocarbons (HC), and a second zone for oxidizing nitric oxide (NO); and a substrate having an inlet end and an outlet end, wherein said first layer is in direct contact with the substrate;

said first zone comprising one or more noble metals, a second inorganic oxide, and a zeolite;

said second zone being substantially free of zeolite and comprising a support material and platinum, palladium, or a mixture or alloy of platinum and palladium;

wherein the NOx storage material comprises ceria doped with at least one dopant selected from lanthanum, neodymium, or metal oxides thereof.

In a second aspect of the invention there is provided an emission treatment system for treating a flow of a combustion exhaust gas comprising the lean NO$_x$ trap catalyst as hereinbefore defined and an internal combustion engine.

In a third aspect of the invention there is provided a method of treating an exhaust gas from an internal combustion engine comprising contacting the exhaust gas with the lean NO$_x$ trap catalyst as hereinbefore defined.

BRIEF DESCRIPTION OF DRAWINGS

FIG. 1 shows a lean NOx trap catalyst having a first layer (3). The first layer functions as a NOx storage layer. The first layer (3) is disposed on a substrate (4) having an inlet end and an outlet end. The catalyst further comprises a second layer comprising a first zone (1) and a second zone (2). The first zone (1) functions as an oxidation zone for oxidizing carbon monoxide (CO) and/or hydrocarbons (HC). The second zone (2) functions as a zone for oxidizing nitric oxide (NO).

DEFINITIONS

The term "washcoat" is well known in the art and refers to an adherent coating that is applied to a substrate, usually during production of a catalyst.

The acronym "PGM" as used herein refers to "platinum group metal". The term "platinum group metal" generally refers to a metal selected from the group consisting of ruthenium, rhodium, palladium, osmium, iridium and platinum, preferably a metal selected from the group consisting of ruthenium, rhodium, palladium, iridium and platinum. In general, the term "PGM" preferably refers to a metal selected from the group consisting of rhodium, platinum and palladium.

The term "noble metal" as used herein generally refers to a metal selected from the group consisting of ruthenium, rhodium, palladium, silver, osmium, iridium, platinum, and gold. In general, the term "noble metal" preferably refers to a metal selected from the group consisting of rhodium, platinum, palladium and gold.

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The term "dopant" as used herein means that the rare earth may be present in the lattice structure of a material, may be on the surface of the material, may be present in pores in the material, or any combination of the above.

The expression "substantially free of" as used herein with reference to a material means that the material may be present in a minor amount, such as ≤5% by weight, preferably ≤2% by weight, more preferably ≤1% by weight. The expression "substantially free of" embraces the expression "does not comprise".

The term "loading" as used herein refers to a measurement in units of g/ft$^3$ on a metal weight basis.

DETAILED DESCRIPTION OF THE INVENTION

The lean NO$_x$ trap catalyst of the invention comprises:
a first layer for storing nitrogen oxides (NOx) under lean exhaust gas conditions and releasing and/or reducing stored NOx during rich exhaust gas conditions, said first layer comprising one or more platinum group metals, a NOx storage material, and a first inorganic oxide;
a second layer disposed on the first layer, said second layer comprising a first zone for oxidizing carbon monoxide (CO) and/or hydrocarbons (HC), and a second zone for oxidizing nitric oxide (NO); and
a substrate having an inlet end and an outlet end, wherein said first layer is in direct contact with the substrate;
said first zone comprising one or more noble metals, a second inorganic oxide, and a zeolite;
said second zone being substantially free of zeolite and comprising a support material and platinum, palladium, or a mixture or alloy of platinum and palladium;
wherein the NOx storage material comprises ceria doped with at least one dopant selected from lanthanum, neodymium, or metal oxides thereof.

Preferably, the NOx storage material comprises ceria doped with neodymium or a metal oxide thereof. The neodymium component can be any salt, oxide, complex or other compound that contains neodymium, for example neodymium(III) oxide. It may also be neodymium metal. For the avoidance of doubt, this list of possible neodymium-containing components is non-limiting.

The dopant (e.g. neodymium) may be present on the surface of the ceria. The dopant (e.g. neodymium) may, additionally or alternatively, be incorporated into the NO$_x$ storage material. One example of the dopant (e.g. neodymium) being incorporated into the NO$_x$ storage material would be the replacement of atoms of the NO$_x$ storage material by neodymium, e.g. in the lattice structure of the ceria.

The NOx storage material comprising ceria doped with at least one dopant selected from lanthanum, neodymium, or metal oxides thereof that is present in the catalysts of the present invention is advantageous in that it stores no, or substantially no, NO$_x$ above a given temperature, such as above 180, 200, 250, or 300° C., preferably above about 300° C. This is advantageous because a rich exhaust stream is therefore not necessary to release and/or convert NO$_x$ under "highway" conditions. This is especially preferable when the NO$_x$ adsorber catalyst composition is present upstream of an SCR or SCRF™ catalyst, as under such conditions the SCR or SCRF™ catalyst will achieve quantitative NO$_x$ conversion. In addition, this low or absent NO$_x$ storage at temperatures in excess of 180, 200, 250 or 300° C., preferably about 300° C., means that there will be no NO$_x$ stored when the vehicle is subsequently used under relatively cold conditions, e.g. under "city" conditions, which has the further advantage of reducing NO$_x$ slippage under such cold conditions.

The dopant (e.g. neodymium) can be present in the ceria any amount, but is preferably present in an amount of about 0.5-18 mol %, more preferably about 1-16 mol %, still more preferably about 2-12 mol %, expressed as a mol % of dopant (e.g. Nd) in the NO$_x$ storage material. For example, the dopant component may be present in about 0.5, 1, 2, 4, 6, 8, 10, 11, 12, 14, 16, or 18 mol %.

The NOx storage material preferably comprises about 0.5-20 wt %, more preferably about 2.5-18.5 wt % of dopant (e.g. neodymium), expressed as a wt % of dopant in the NOx storage material. The wt % refers to the amount of dopant present in the first layer only.

The one or more platinum group metals in the first layer is preferably selected from the group consisting of palladium, platinum, rhodium, and mixtures thereof. Particularly preferably, the one or more platinum group metals is a mixture or alloy of platinum and palladium, preferably wherein the ratio of platinum to palladium is from 2:1 to 12:1 on a w/w basis, and particularly preferably about 5:1 on a w/w basis.

The lean NO$_x$ trap catalyst preferably comprises the one or more platinum group metals in the first layer in a loading of about 10 to about 110 g/ft$^3$. Preferably the one or more platinum group metals in the first layer are present in a loading of about 35 to about 90 g/ft$^3$, preferably about 40 to about 75 g/ft$^3$, more preferably about 50 to about 70 g/ft$^3$.

It has surprisingly been found that the catalytic performance of lean NOx trap catalysts of the present invention does not necessarily increase by increasing the loading (i.e. amount) of the one or more platinum group metals in the first layer. Rather, it has been found that catalysts according to the invention can employ platinum group metal "thrifting", such that a lower loading of platinum group metals in the first (i.e. NOx storage) layer can be used while still retaining acceptable and in some cases improved catalytic activity despite a lower amount of platinum group metals being used. This is contrary to the technical prejudice in the art, which is that increasing the amount of platinum group metals present should increase catalytic activity, with the drawback of added cost. The catalysts of the present invention are therefore particularly advantageous in that they can use lower amounts of expensive platinum group metals while still retaining acceptable catalytic performance. Catalysts of the present invention may also be advantageous in that they more efficiently use a set amount of platinum group metals in the catalyst as a whole, and hence achieve improved performance at a fixed platinum group metal loading when compared to a conventional catalyst.

Preferably the one or more platinum group metals do not comprise or consist of rhodium. In other words, the first layer is preferably substantially free of rhodium.

The one or more platinum group metals are generally in contact with the first inorganic oxide. Preferably the one or more platinum group metals are supported on the first inorganic oxide. Thus the first inorganic oxide may preferably be a support material for the one or more platinum group metals.

The first inorganic oxide is preferably an oxide of Groups 2, 3, 4, 5, 13 and 14 elements. The first inorganic oxide is preferably a refractory metal oxide selected from the group consisting of alumina, ceria, magnesia, silica, titania, zirconia, niobia, tantalum oxides, molybdenum oxides, tungsten oxides, and mixed oxides or composite oxides thereof. Particularly preferably, the first inorganic oxide is alumina, ceria, or a magnesia/alumina composite oxide. One especially preferred inorganic oxide is a magnesia/alumina composite oxide, optionally further comprising a cerium-containing component, e.g. ceria. In such cases the ceria may be present on the surface of the magnesia/alumina composite oxide, e.g. as a coating.

Preferred first inorganic oxides preferably have a surface area in the range 10 to 1500 m$^2$/g, pore volumes in the range 0.1 to 4 mL/g, and pore diameters from about 10 to 1000 Angstroms. High surface area inorganic oxides having a surface area greater than 80 m$^2$/g are particularly preferred, e.g. high surface area ceria or alumina.

The one or more platinum group metals is preferably selected from the group consisting of palladium, platinum, rhodium, silver, gold, and mixtures thereof. Particularly preferably, the one or more platinum group metals is a mixture or alloy of platinum and palladium, preferably wherein the ratio of platinum to palladium is from 2:1 to 10:1 on a w/w basis, especially preferably about 5:1 on a w/w basis.

Preferably the one or more platinum group metals do not comprise or consist of rhodium. Preferably the first layer is substantially free of rhodium. In some embodiments therefore the first layer is preferably substantially free of rhodium. This may be advantageous as rhodium can negatively affect the catalytic activity of other catalytic metals, such as platinum, palladium, or mixtures and/or alloys thereof.

In preferred catalysts of the invention, the first layer is substantially free of barium. Particularly preferred first layers, and lean NOx trap catalysts are also substantially free of alkali metals, e.g. potassium (K) and sodium (Na).

Catalysts of the invention that do not comprise barium as a NO$_x$ storage material may be particularly advantageous because they store less NO$_x$ at temperatures in excess of 180, 200, 250 or 300° C., preferably about 300° C. than a comparable barium-containing catalyst. In other words, catalysts of the invention that do not comprise barium as a NO$_x$ storage material, have improved NO$_x$ release properties at temperatures in excess of 180, 200, 250 or 300° C., preferably about 300° C. than a comparable barium-containing catalyst. Such catalysts may also have improved sulfur tolerance relative to an equivalent barium-containing catalyst. In this context, "improved sulfur tolerance" means that catalysts in which barium is not present as a NO$_x$ storage material are either more resistant to sulfation, can be thermally desulfated at a lower temperature, or both, compared to an equivalent barium-containing NO$_x$ storage material.

The substrate having an inlet end and an outlet end is a flow-through monolith or a wall-flow filter monolith, preferably a flow-through monolith. The substrate has a first face and a second face defining a longitudinal direction therebetween. The substrate has a plurality of channels extending between the first face and the second face. The plurality of channels extend in the longitudinal direction and provide a plurality of inner surfaces (e.g. the surfaces of the walls defining each channel). Each of the plurality of channels has an opening at the first face and an opening at the second face.

The first face is typically at an inlet end of the substrate and the second face is at an outlet end of the substrate.

The channels may be of a constant width and each plurality of channels may have a uniform channel width.

Preferably within a plane orthogonal to the longitudinal direction, the substrate has from 100 to 500 channels per square inch, preferably from 200 to 400. For example, on the first face, the density of open first channels and closed second channels is from 200 to 400 channels per square inch. The channels can have cross sections that are rectangular, square, circular, oval, triangular, hexagonal, or other polygonal shapes.

The substrate acts as a support for holding catalytic material. Suitable materials for forming the substrate include ceramic-like materials such as cordierite, silicon carbide, silicon nitride, zirconia, mullite, spodumene, alumina-silica magnesia or zirconium silicate, or of porous, refractory metal. Such materials and their use in the manufacture of porous monolith substrates is well known in the art.

It should be noted that the substrate, e.g. the flow-through monolith substrate, described herein is a single component (i.e. a single brick). Nonetheless, when forming an emission treatment system, the substrate used may be formed by adhering together a plurality of channels or by adhering together a plurality of smaller substrates as described herein. Such techniques are well known in the art, as well as suitable casings and configurations of the emission treatment system.

In embodiments wherein the lean NO$_x$ trap catalyst comprises a ceramic substrate, the ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates and metallo aluminosilicates (such as cordierite and spodumene), or a mixture or mixed oxide of any two or more thereof. Cordierite, a magnesium aluminosilicate, and silicon carbide are particularly preferred.

In embodiments wherein the lean $NO_x$ trap catalyst comprises a metallic substrate, the metallic substrate may be made of any suitable metal, and in particular heat-resistant metals and metal alloys such as titanium and stainless steel as well as ferritic alloys containing iron, nickel, chromium, and/or aluminium in addition to other trace metals.

The second inorganic oxide is preferably an oxide of Groups 2, 3, 4, 5, 13 and 14 elements. The second inorganic oxide is preferably a refractory metal oxide selected from the group consisting of alumina, ceria, magnesia, silica, titania, zirconia, niobia, tantalum oxides, molybdenum oxides, tungsten oxides, and mixed oxides or composite oxides thereof. Particularly preferably, the second inorganic oxide is alumina, ceria, or a magnesia/alumina composite oxide. One especially preferred second inorganic oxide is alumina doped with a dopant, e.g. alumina doped with lanthanum or alumina doped with silica, particularly preferably alumina doped with silica.

The second inorganic oxide may be a support material for the one or more noble metals.

Preferred second inorganic oxides preferably have a surface area in the range 10 to 1500 $m^2/g$, pore volumes in the range 0.1 to 4 mL/g, and pore diameters from about 10 to 1000 Angstroms. High surface area inorganic oxides having a surface area greater than 80 $m^2/g$ are particularly preferred, e.g. high surface area ceria or alumina.

The one or more noble metals is preferably selected from the group consisting of palladium, platinum, rhodium, silver, gold, and mixtures thereof. Particularly preferably, the one or more noble metals is a mixture or alloy of platinum and palladium, preferably wherein the ratio of platinum to palladium is from 1:10 to 10:1 on a w/w basis, more preferably from about 1:1 to about 5:1 on a w/w basis, and especially preferably about 2:1 on a w/w basis.

Preferably the one or more noble metals do not comprise or consist of rhodium. Preferably the first zone is substantially free of rhodium. In some embodiments therefore the second layer is preferably substantially free of rhodium. This may be advantageous as rhodium can negatively affect the catalytic activity of other catalytic metals, such as platinum, palladium, or mixtures and/or alloys thereof.

The lean $NO_x$ trap catalyst preferably comprises the one or more noble metals in the first zone (i.e. the first zone of the second layer) in a loading of about 10 to about 110 $g/ft^3$. Preferably the one or more platinum group metals in the first layer are present in a loading of about 35 to about 90 $g/ft^3$, more preferably about 40 to about 75 $g/ft^3$, even more preferably about 50 to about 70 $g/ft^3$, and particularly preferably about 70 $g/ft^3$.

The first zone further comprises a zeolite. The zeolite may function as a hydrocarbon adsorbent material.

The zeolite is typically selected from an aluminosilicate zeolite, an aluminophosphate zeolite and a silico-aluminophosphate zeolite. For example, the zeolite is typically selected from an aluminosilicate zeolite and an aluminophosphate zeolite. It is preferred that the zeolite is selected from an aluminosilicate zeolite and a silico-aluminophosphate zeolite. More preferably, the zeolite is an aluminosilicate zeolite.

Typically, the zeolite is composed of aluminium, silicon, and/or phosphorus. The zeolite generally has a three-dimensional arrangement of $SiO_4$, $AlO_4$, and/or $PO_4$ that are joined by the sharing of oxygen atoms. The zeolite may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

The zeolite typically has a silica to alumina molar ratio (SAR) of 10 to 200 (e.g. 10 to 40), such as 10 to 100, more preferably 15 to 80 (e.g. 15 to 30). The SAR generally relates to an aluminosilicate zeolite or a silico-aluminophosphate zeolite.

It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms), particularly preferably a large pore zeolite. It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite, particularly preferably a beta zeolite.

Each of the aforementioned three-letter codes represents a framework type in accordance with the "IUPAC Commission on Zeolite Nomenclature" and/or the "Structure Commission of the International Zeolite Association".

The zeolite may further comprise a base metal. The base metal may be selected from the group consisting of iron (Fe), copper (Cu), manganese (Mn), chromium (Cr), cobalt (Co), nickel (Ni), and tin (Sn), as well as mixtures of two or more thereof. It is preferred that the base metal is selected from the group consisting of iron, copper and cobalt, more preferably iron and copper. Even more preferably, the base metal is iron.

Alternatively, the zeolite catalyst may be substantially free of a base metal. Thus, the zeolite catalyst may not comprise a base metal. In general, it is preferred that the zeolite catalyst does not comprise a base metal.

The zeolite is preferably substantially free of a platinum group metal, such as a platinum group metal selected from the group consisting of ruthenium (Ru), rhodium (Rh), palladium (Pd), platinum (Pt), and mixtures of two or more thereof.

The total amount of zeolite in the first zone is 0.05 to 3.00 $g\ in^{-3}$, particularly 0.10 to 2.00 $g\ in^{-3}$, more particularly 0.2 to 1.0 $g\ in^{-3}$. For example, the total amount of hydrocarbon adsorbent may be 0.8 to 1.75 $g\ in^{-3}$, such as 1.0 to 1.5 $g\ in^{-3}$.

The first zone may further comprise an alkaline earth metal. The first zone typically comprises an effective amount of an alkaline earth metal for promoting oxidation of carbon monoxide (CO) and/or hydrocarbons (HCs). The first zone typically comprises an alkaline earth metal, e.g. barium (Ba).

The alkaline earth metal may promote the oxidation of CO and/or HCs (e.g. low temperature oxidation activity of CO and/or HCs may be improved), particularly when (i) the alkaline earth metal is combined with certain second inorganic oxides (which function as support materials), such as alumina doped with dopant, especially alumina doped with silica, and/or (ii) the washcoat region comprises a total weight of platinum that is greater than or equal to the total weight of palladium (e.g. the ratio of Pt:Pd by weight is ≥1:1).

The alkaline earth metal may be selected from magnesium (Mg), calcium (Ca), strontium (Sr), barium (Ba) and a combination of two or more thereof. The alkaline earth metal is preferably calcium (Ca), strontium (Sr), or barium (Ba), more preferably strontium (Sr) or barium (Ba), and most preferably the alkaline earth metal is barium (Ba).

It is generally preferred that the alkaline earth metal is disposed or supported on the second inorganic oxide.

Typically, the first zone comprises a total amount of the alkaline earth metal of 0.07 to 3.75 mol ft$^{-3}$, particularly 0.1 to 3.0 mol ft$^{-3}$, more particularly 0.2 to 2.5 mol ft$^{-3}$ (e.g. 0.25 to 1.0 mol ft$^{-3}$), such as 0.3 to 2.25 mol ft$^{-3}$, especially 0.35 to 1.85 mol ft$^{-3}$, preferably 0.4 to 1.5 mol ft$^{-3}$, even more preferably 0.5 to 1.25 mol ft$^{-3}$.

In general, the first zone comprises a total amount of the alkaline earth metal of 10 to 500 g ft$^{-3}$ (e.g. 60 to 400 g ft$^{-3}$ or 10 to 450 g ft$^{-3}$), particularly 20 to 400 g ft$^{-3}$, more particularly 35 to 350 g ft$^{-3}$, such as 50 to 300 g ft$^{-3}$, especially 75 to 250 g ft$^{-3}$.

The first zone generally comprises an amount of the alkaline earth metal of 0.1 to 20% by weight, preferably 0.5 to 17.5% by weight, more preferably 1 to 15% by weight, and even more preferably 1.5 to 12.5% by weight. The amount of the alkaline earth metal may be from 1.0 to 8.0% by weight, such as 1.5 to 7.5% by weight, particularly 2.0 to 7.0% by weight (e.g. 2.5 to 6.5% by weight or 2.0 to 5.0% by weight). The amount of the alkaline earth metal may be from 5.0 to 17.5% by weight, such as 7.5 to 15% by weight, particularly 8.0 to 14% by weight (e.g. 8.5 to 12.5% by weight or 9.0 to 13.5% by weight).

Typically, the first zone comprises a ratio by weight of the alkaline earth metal to noble metal of 0.25:1 to 20:1 (e.g. 0.3:1 to 20:1). It is preferred that the ratio of the total mass of the alkaline earth metal to the total mass of the noble metal is 0.5:1 to 17:1, more preferably 1:1 to 15:1, particularly 1.5:1 to 10:1, still more preferably 2:1 to 7.5:1, and even more preferably 2.5:1 to 5:1.

The first zone may further comprise manganese (Mn). The manganese may be present in an elemental form or as an oxide.

Platinum is expensive and is often included in oxidation catalysts in relatively large amounts for its oxidative activity. The inclusion of manganese (Mn) in combination with platinum (Pt) and/or palladium (Pd) may result in an improvement in NO oxidation activity or allow the use of a reduced amount of noble metal to achieve a given level of oxidation activity.

The manganese (Mn) is typically disposed or supported on the second inorganic oxide. The manganese (Mn) may be disposed directly onto or is directly supported by the second inorganic oxide (e.g. there is no intervening support material between the Mn and the second inorganic oxide).

The first zone typically has a total loading of manganese (Mn) of 5 to 500 g ft$^{-3}$. It is preferred that the first zone has a total loading of manganese (Mn) of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

Typically, the first zone comprises a ratio of Mn:Pt by weight of 5:1, more preferably <5:1.

In general, the first zone comprises a ratio of Mn:Pt by weight of 0.2:1 (e.g. 0.5:1), more preferably >0.2:1 (e.g. >0.5:1).

The first zone may comprise a ratio by total weight of manganese (Mn) to platinum of 5:1 to 0.2:1 (e.g. 5:1 to 1:2), preferably 4.5:1 to 1:1 (e.g. 4:1 to 1.1:1), more preferably 4:1 to 1.5:1.

When the first zone comprises manganese, then preferably the second inorganic oxide, may comprise, or consist essentially of, alumina optionally doped with a dopant (e.g. alumina doped with silica). It has been found that the combination of manganese (Mn), platinum (Pt) and a doped alumina support material, particularly an alumina support material doped with silica, provides excellent oxidation activity and can stabilise oxidation activity of the oxidation catalyst over its lifetime.

It is generally preferred that the first zone does not comprise both an alkaline earth metal and manganese. Thus, when the first zone comprises manganese, it is preferred that the first zone does not comprise an alkaline earth metal. When the first zone comprises an alkaline earth metal, it is preferred that the first zone does not comprise manganese.

When the first zone comprises manganese, then the first zone typically does not comprise indium and/or iridium, preferably the first zone does not comprise indium, iridium and/or magnesium.

The second zone (i.e. the second zone of the second layer) comprises a support material and platinum, palladium, or a mixture or alloy of platinum and palladium. The second zone is for oxidizing nitric oxide (NO).

Preferably, the second zone comprises platinum as the only catalytic metal. That is, the second zone preferably does not comprise palladium and preferably does not comprise rhodium.

The second zone preferably comprises platinum in a loading of about 10 to about 110 g/ft$^3$, preferably about 20 to about 80 g/ft$^3$, and particularly preferably about 40 g/ft$^3$ or about 70 g/ft$^3$.

The support material is preferably an oxide of Groups 2, 3, 4, 5, 13 and 14 elements. The support material is preferably a refractory metal oxide selected from the group consisting of alumina, ceria, magnesia, silica, titania, zirconia, niobia, tantalum oxides, molybdenum oxides, tungsten oxides, and mixed oxides or composite oxides thereof. Particularly preferably, the support material is alumina, ceria, or a magnesia/alumina composite oxide. One especially preferred support material is alumina, e.g. gamma-alumina.

The support material may be a support material for the platinum, palladium or mixture or alloy of platinum and palladium.

Preferred support materials preferably have a surface area in the range 10 to 1500 m$^2$/g, pore volumes in the range 0.1 to 4 mL/g, and pore diameters from about 10 to 1000 Angstroms. High surface area inorganic oxides having a surface area greater than 80 m$^2$/g are particularly preferred, e.g. high surface area ceria or alumina.

The lean NO$_x$ trap catalysts of the invention may comprise further components that are known to the skilled person. For example, the compositions of the invention may further comprise at least one binder and/or at least one surfactant. Where a binder is present, dispersible alumina binders are preferred.

The first layer and/or the second layer (i.e. the second layer comprising the first zone and the second zone) are disposed or supported on the substrate having an inlet end and an outlet end.

In general, it is preferred that the first layer extends for an entire length (i.e. substantially an entire length) of the substrate, particularly the entire length of the channels of a substrate monolith. Typically the first layer has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The first zone is arranged to contact the exhaust gas at or near the inlet end of the substrate. Accordingly, the first zone is preferably disposed or supported upstream of the second zone. Preferably, the first zone is disposed at or near an inlet end of the substrate and the second zone is disposed at or near an outlet end of the substrate.

In a preferred arrangement, the first layer is deposited on the substrate, the first zone is deposited on the first layer, and the second zone is deposited on the first layer. Preferably the second zone is arranged to contact the exhaust gas at the outlet end of the substrate and after contact of the exhaust gas with the first zone.

A part or portion of the first zone may be in contact with the second zone, or the first zone and the second zone may be separated (e.g. by a gap). Preferably, however, there is no, or substantially no (i.e. less than 10%, more preferably less than 5% of the axial length of the first layer) gap between the first zone and the second zone. Particularly preferably, the first zone is in contact with the second zone.

The first zone may overlap the second zone. Thus, an end portion or part of the first zone may be disposed or supported on the second zone. The first zone may completely or partly overlap the second zone. When the first zone overlaps the second zone, it is preferred that first zone only partly overlaps the second zone (i.e. the top, outermost surface of the second zone is not completely covered by the first zone).

Alternatively, the second zone may overlap the first zone. Thus, an end portion or part of the second zone may be disposed or supported on the first zone. The second zone generally only partly overlaps the first zone.

It is preferred that the first zone and the second zone do not substantially overlap. It is particularly preferred that the first zone and the second zone are in contact with each other. That is, it is particularly preferred that the end of the first zone that is farthest from the inlet end of the substrate is in contact with the end of the second zone that is farthest from the outlet end of the substrate.

Thus, in a preferred embodiment of the invention, the first layer is deposited directly on the substrate having an inlet end and an outlet end, the first zone is deposited directly on the first layer and extends from the inlet end of the substrate to less than the axial length of the first layer, and the second zone is deposited directly on the first layer and extends from the outlet end of the substrate to less than the axial length of the first layer. This arrangement is shown in FIG. 1, in which a first layer 3 is deposited on a substrate 4, and a first zone 1 extends from the inlet end of the substrate 4 and a second zone 2 extends from the outlet end of the substrate. Both the first zone 1 and the second zone 2 are deposited directly on the first layer 3.

This preferred embodiment of the invention may show advantageous oxidative activity, particularly toward NOx when it has an arrangement that facilitates the contact of the exhaust gas with the second zone (comprising a support material and platinum, palladium, or a mixture or alloy of platinum and palladium) shortly before the exhaust gas exits the catalyst and after it has been in contact with the first layer (comprising one or more platinum group metals, a NOx storage material, and a first inorganic oxide). In such arrangements, after the exhaust gas has passed through or over the first layer, it comes into contact with the second zone (i.e. a zone for oxidising NO) before it finally passes through the outlet of the catalyst.

Substrates for supporting lean NOx trap catalysts for treating an exhaust gas from a diesel engine are well known in the art. Methods of making washcoats and applying washcoats onto a substrate are also known in the art (see, for example, our WO 99/47260, WO 2007/077462 and WO 2011/080525).

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which channels are open at both ends.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The substrate may be an electrically heatable substrate (i.e. the electrically heatable substrate is an electrically heating substrate, in use). When the substrate is an electrically heatable substrate, the oxidation catalyst of the invention comprises an electrical power connection, preferably at least two electrical power connections, more preferably only two electrical power connections. Each electrical power connection may be electrically connected to the electrically heatable substrate and an electrical power source. The oxidation catalyst can be heated by Joule heating, where an electric current through a resistor converts electrical energy into heat energy.

The electrically heatable substrate can be used to release any stored NOx from the first washcoat region. Thus, when the electrically heatable substrate is switched on, the oxidation catalyst will be heated and the temperature of the first washcoat region can be brought up to its NOx release temperature. Examples of suitable electrically heatable substrates are described in U.S. Pat. Nos. 4,300,956, 5,146,743 and 6,513,324.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

Alternatively, the first layer and/or second layer may be extruded to form a flow-through or filter substrate.

The lean $NO_x$ trap catalysts of the invention may be prepared by any suitable means. For example, the first layer may be prepared by mixing the one or more platinum group metals, a $NO_x$ storage material, and a first inorganic oxide in any order. The manner and order of addition is not considered to be particularly critical. For example, each of the components of the first layer may be added to any other component or components simultaneously, or may be added sequentially in any order. Each of the components of the first layer may be added to any other component of the first layer by impregnation, adsorption, ion-exchange, incipient wetness, precipitation, or the like, or by any other means commonly known in the art.

The first zone may be prepared by mixing the one or more noble metals, a second inorganic oxide, and a zeolite in any order. The manner and order of addition is not considered to be particularly critical. For example, each of the components of the first zone may be added to any other component or components simultaneously, or may be added sequentially in any order. Each of the components of the first zone may be added to any other component of the second layer by impregnation, adsorption, ion-exchange, incipient wetness, precipitation, or the like, or by any other means commonly known in the art.

The second zone may be prepared by mixing the support material and platinum, palladium, or a mixture or alloy of platinum and palladium in any order. The manner and order of addition is not considered to be particularly critical. For example, each of the components of the second zone may be added to any other component or components simultaneously, or may be added sequentially in any order. Each of the components of the second zone may be added to any other component of the second layer by impregnation, adsorption, ion-exchange, incipient wetness, precipitation, or the like, or by any other means commonly known in the art.

Preferably, the lean $NO_x$ trap catalyst as hereinbefore described is prepared by depositing the lean $NO_x$ trap catalyst on the substrate using washcoat procedures. A representative process for preparing the lean $NO_x$ trap catalyst using a washcoat procedure is set forth below. It will be understood that the process below can be varied according to different embodiments of the invention.

The washcoating is preferably performed by first slurrying finely divided particles of the components of the lean $NO_x$ trap catalyst as hereinbefore defined in an appropriate solvent, preferably water, to form a slurry. The slurry preferably contains between 5 to 70 weight percent solids, more preferably between 10 to 50 weight percent. Preferably, the particles are milled or subject to another comminution process in order to ensure that substantially all of the solid particles have a particle size of less than 20 microns in an average diameter, prior to forming the slurry. Additional components, such as stabilizers, binders, surfactants or promoters, may also be incorporated in the slurry as a mixture of water soluble or water-dispersible compounds or complexes.

The substrate may then be coated one or more times with the slurry such that there will be deposited on the substrate the desired loading of the lean $NO_x$ trap catalyst.

Preferably the first layer is supported/deposited directly on the metal or ceramic substrate. By "directly on" it is meant that there are no intervening or underlying layers present between the first layer and the metal or ceramic substrate.

Preferably the second layer (i.e. the first zone and the second zone) is deposited on the first layer. Particularly preferably the second layer is deposited directly on the first layer. By "directly on" it is meant that there are no intervening or underlying layers present between the second layer and the first layer.

Thus in a preferred lean $NO_x$ trap catalyst of the invention, the first layer is deposited directly on the metal or ceramic substrate, and the second layer is deposited on the first layer.

One or more additional layers may be present in addition to the first layer and the second layer as hereinbefore described. However, preferably no additional layers are present, i.e. the lean NOx trap catalyst of the present invention preferably consists of the first layer as hereinbefore described, the second layer as hereinbefore described, and a substrate having an inlet end and an outlet end as hereinbefore described.

Preferably, in the lean $NO_x$ trap catalyst of the present invention, the ratio of the loading in $g/ft^3$ of the one or more noble metals in the first zone to the loading in $g/ft^3$ of the one or more platinum group metals in the first layer is between about 1:1.5 and about 4:1, preferably between about 1.5:1 and about 1:0.8, and particularly preferably about 1.33:1 and about 1:1. It has surprisingly been found that certain ratios of catalytic metal loadings in the catalysts of the invention result in improved CO oxidation performance, particularly when there is a greater loading of one or more noble metals in the first zone than of one or more platinum group metals in the second zone. This unexpected effect allows for the reduction, or "thrifting", of the total loading of catalytic metals in catalysts of the invention while still retaining acceptable catalytic performance.

Alternatively, improved oxidation performance may be achieved by using the same total loading of catalytic metals, but with the specific ratios of catalytic metals between the first zone (i.e. a zone for oxidizing carbon monoxide (CO) and/or hydrocarbons (HC)) and the first layer (i.e. a layer for storing nitrogen oxides (NOx) under lean exhaust gas conditions and releasing and/or reducing stored NOx during rich exhaust gas conditions). Thus, where the ratio of the loading in $g/ft^3$ of the one or more noble metals in the first zone to the loading in $g/ft^3$ of the one or more platinum group metals in the first layer is between about 1:1.5 and about 4:1, preferably between about 1.5:1 and about 1:0.8, and particularly preferably about 1.33:1 and about 1:1, improved CO oxidation performance is obtained for a given total catalytic metal loading in the catalyst compared to conventional catalysts. Distributing the catalytic metals in the lean NO$_x$ trap catalyst in this way has surprisingly been found to have the unexpected advantage that the catalytic performance of the catalyst is improved relative to a conventional catalytic metal distribution. Alternatively, and particularly advantageously, distributing the catalytic metals in this way allows for "thrifting", i.e. lowering the total amount of the expensive catalytic metals that are present, while still retaining sufficient catalytic performance to meet current emissions control standards.

A further aspect of the invention is an emission treatment system for treating a flow of a combustion exhaust gas from an internal combustion engine comprising the lean NO$_x$ trap catalyst as hereinbefore defined. In preferred systems, the internal combustion engine is a diesel engine, preferably a light duty diesel engine. The lean NO$_x$ trap catalyst may be placed in a close-coupled position or in the underfloor position.

The emission treatment system typically further comprises an emissions control device.

The emissions control devices is preferably downstream of the lean NO$_x$ trap catalyst.

Examples of an emissions control device include a diesel particulate filter (DPF), a lean NO$_x$ trap (LNT), a lean NO$_x$ catalyst (LNC), a selective catalytic reduction (SCR) catalyst, a diesel oxidation catalyst (DOC), a catalysed soot filter (CSF), a passive NO$_x$ adsorber (PNA), a diesel cold start catalyst (dCSC™), a selective catalytic reduction filter (SCRF™) catalyst, an ammonia slip catalyst (ASC), a cold start catalyst (dCSC™) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the emission treatment system comprises an emissions control device selected from the group consisting of a lean NO$_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the emission treatment system of the invention comprises an SCR catalyst or an SCRF™ catalyst, then the emission treatment system may further comprise an injector for injecting a nitrogenous reductant, such as ammonia, or an ammonia precursor, such as urea or ammonium formate, preferably urea, into exhaust gas downstream of the lean NO$_x$ trap catalyst and upstream of the SCR catalyst or the SCRF™ catalyst.

Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst, e.g. a lean NO$_x$ trap catalyst of the invention). Thus, the emission treatment system may further comprise an engine management means for enriching the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of Al$_2$O$_3$, TiO$_2$, CeO$_2$, SiO$_2$, ZrO$_2$ and mixed oxides containing two or more thereof. The non-zeolite catalyst can also include tungsten oxide (e.g. V$_2$O$_5$/WO$_3$/TiO$_2$, WO$_x$/CeZrO$_2$, WO$_x$/ZrO$_2$ or Fe/WO$_x$/ZrO$_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the emission treatment system of the invention, preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first emission treatment system embodiment, the emission treatment system comprises the lean NO$_x$ trap catalyst of the invention and a catalysed soot filter (CSF). The lean NO$_x$ trap catalyst is typically followed by (e.g. is upstream of) the catalysed soot filter (CSF). Thus, for example, an outlet of the lean NO$_x$ trap catalyst is connected to an inlet of the catalysed soot filter.

A second emission treatment system embodiment relates to an emission treatment system comprising the lean NO$_x$ trap catalyst of the invention, a catalysed soot filter (CSF) and a selective catalytic reduction (SCR) catalyst.

The lean NO$_x$ trap catalyst is typically followed by (e.g. is upstream of) the catalysed soot filter (CSF). The catalysed soot filter is typically followed by (e.g. is upstream of) the selective catalytic reduction (SCR) catalyst. A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In a third emission treatment system embodiment, the emission treatment system comprises the lean $NO_x$ trap catalyst of the invention, a selective catalytic reduction (SCR) catalyst and either a catalysed soot filter (CSF) or a diesel particulate filter (DPF).

In the third emission treatment system embodiment, the lean $NO_x$ trap catalyst of the invention is typically followed by (e.g. is upstream of) the selective catalytic reduction (SCR) catalyst. A nitrogenous reductant injector may be arranged between the oxidation catalyst and the selective catalytic reduction (SCR) catalyst. Thus, the catalyzed monolith substrate may be followed by (e.g. is upstream of) a nitrogenous reductant injector, and the nitrogenous reductant injector may be followed by (e.g. is upstream of) the selective catalytic reduction (SCR) catalyst. The selective catalytic reduction (SCR) catalyst are followed by (e.g. are upstream of) the catalysed soot filter (CSF) or the diesel particulate filter (DPF).

A fourth emission treatment system embodiment comprises the lean $NO_x$ trap catalyst of the invention and a selective catalytic reduction filter (SCRF™) catalyst. The lean $NO_x$ trap catalyst of the invention is typically followed by (e.g. is upstream of) the selective catalytic reduction filter (SCRF™) catalyst.

A nitrogenous reductant injector may be arranged between the lean $NO_x$ trap catalyst and the selective catalytic reduction filter (SCRF™) catalyst. Thus, the lean $NO_x$ trap catalyst may be followed by (e.g. is upstream of) a nitrogenous reductant injector, and the nitrogenous reductant injector may be followed by (e.g. is upstream of) the selective catalytic reduction filter (SCRF™) catalyst.

When the emission treatment system comprises a selective catalytic reduction (SCR) catalyst or a selective catalytic reduction filter (SCRF™) catalyst, such as in the second to fourth exhaust system embodiments described hereinabove, an ASC can be disposed downstream from the SCR catalyst or the SCRF™ catalyst (i.e. as a separate monolith substrate), or more preferably a zone on a downstream or trailing end of the monolith substrate comprising the SCR catalyst can be used as a support for the ASC.

Another aspect of the invention relates to a vehicle. The vehicle comprises an internal combustion engine, preferably a diesel engine. The internal combustion engine preferably the diesel engine, is coupled to an emission treatment system of the invention.

It is preferred that the diesel engine is configured or adapted to run on fuel, preferably diesel fuel, comprising 50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg. In the US, a light-duty diesel vehicle (LDV) refers to a diesel vehicle having a gross weight of 8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

A further aspect of the invention is a method of treating an exhaust gas from an internal combustion engine comprising contacting the exhaust gas with the lean $NO_x$ trap catalyst as hereinbefore described or the emission treatment system as hereinbefore described. In preferred methods, the exhaust gas is a rich gas mixture. In further preferred methods, the exhaust gas cycles between a rich gas mixture and a lean gas mixture.

In some preferred methods of treating an exhaust gas from an internal combustion engine, the exhaust gas is at a temperature of about 150 to 300° C.

EXAMPLES

The invention will now be illustrated by the following non-limiting examples.

Materials

All materials are commercially available and were obtained from known suppliers, unless noted otherwise.

General preparation 1 903 g $Nd(NO_3)_3$ was dissolved in 3583 g demineralized water. 1850 g of a high surface area $CeO_2$ was added in powder form and the mixture stirred for 60 minutes. The resulting slurry was spray-dried on a Spray Dryer in counter-current mode (two-fluid, fountain nozzle, with inlet temperature set at 300° C. and outlet 110° C.). The resulting powder was collected from the cyclone. The powder was calcined at 650° C. for 1 hour in a static oven.

A series of catalysts were prepared according to the Example Preparation below. The loading of the PGM (i.e. platinum and palladium) in the lower, NOx storage, layer was varied, while the loading of the PGM (i.e. platinum and palladium) in the inlet upper DOC zone was kept constant at 70 g/ft³. The PGM loading in the lower, NOx storage layer, is shown in Table 1 below.

The Pt:Pd ratio in the NOx storage layer was kept constant at 5:1.

The Pt:Pd ratio in the inlet upper DOC zone was kept constant at 2:1.

TABLE 1

| | NOx storage layer PGM loading (g/ft³) | Ratio of inlet upper DOC zone loading:NOx storage layer PGM loading |
|---|---|---|
| Catalyst 1 | 90 | 1:1.3 |
| Catalyst 2 | 70 | 1:1 |
| Catalyst 3 | 52.6 | 1.33:1 |
| Catalyst 4 | 35 | 2:1 |
| Catalyst 5 | 17.5 | 4:1 |

Example Preparation (Total PGM Loading: 120 g/ft³)

Preparation of [$Al_2O_3.CeO_2.MgO$].Pt.Pd.$CeO_2$Nd.$Al_2O_3$—Lower Layer 1.24 g/in³ [$Al_2O_3.CeO_2.MgO$] (prepared according to general preparation 1 above) was made into a slurry with distilled water and then milled to reduce the average particle size ($d_{90}$=13-15 μm). To the slurry, 43.5 g/ft³Pt as nitrate solution and 9 g/ft³Pd as nitrate solution were added, and stirred until homogenous. The Pt/Pd was allowed to adsorb onto the support for 1 hour. To this slurry was added 3 g/in³ of $CeO_2$Nd (preparing according to general preparation 1 above) followed by 0.2 g/in³$Al_2O_3$ binder and 0.2 weight percent of a hydroxyethylcellulose rheology modifier. The resultant slurry was then stirred until homogeneous to form a washcoat.

Preparation of [Al$_2$O$_3$.SiO$_2$).BaO.Pt.Pd.CeO$_2$.Zeolite—Inlet Top Layer 1.2 g/in$^3$ Al$_2$O$_3$(95%)—SiO$_2$(5%) powder was mixed with deionized water into a slurry, which was then milled to reduce the average particle size (d$_{50}$=4-6 μm, d$_{30}$=13-19 μm). 100 g/ft$^3$ Ba as barium acetate was then added to the slurry, followed by the addition of 44 g/ft$^3$ Pt as nitrate solution and 22 g/ft$^3$ Pd as nitrate solution, and then stirred until homogeneous. The mixture was then allowed to stand for 30 minutes to allow the PGM to adsorb onto the support. Following this 0.3 g/in$^3$ zeolite-β (Si:Al ratio+40) was added along with more distilled water and 0.1 weight percent of a hydroxyethylcellulose rheology modifier and stirred until homogenous.

Preparation of Al$_2$O$_3$.Pt.Pd—Outlet Top Layer 1.3 g/in$^3$ γ-Al$_2$O$_3$ powder was mixed with deionized water into a slurry, which was then milled to reduce the average particle size (d$_{50}$=5-7 μm, d$_{90}$<16 μm). To this slurry was then added 200 g/ft$^3$ citric acid followed by 44 g/ft$^3$ Pt as nitrate solution and then stirred and then allowed to stand for 30 minutes to adsorb onto the support. The resulting washcoat was then pH adjusted using ammonia to pH 6.5-7. More distilled water was then added and 0.2 weight percent of a hydroxyethylcellulose rheology modifier and stirred until homogenous.

Experimental Results

The catalysts prepared in accordance with the Example Preparation were hydrothermally aged at 800° C. for 16 h, in a gas stream consisting of 10% H$_2$O, 20% O$_2$, and balance N$_2$. CO conversion performance was evaluated on a transient 1.6 engine light-off test. The catalysts were preconditioned with a 5 s rich event at a λ=0.95 at a variety of NSC inlet temperatures (see Table 2). Catalytic activity was measured as CO T50 as a function of the lower, NOx storage layer, PGM content.

TABLE 2

|  | Activation temperature (° C.) | | | | |
| --- | --- | --- | --- | --- | --- |
|  | 180 | 200 | 225 | 250 | 275 |
| Catalyst 1 | 166.5 | 155.6 | 147.5 | 143.8 | 143 |
| Catalyst 2 | 159.7 | 147.4 | 135.9 | 137.4 | 139.2 |
| Catalyst 3 | 158.7 | 144.6 | 138.2 | 134.7 | 138.1 |
| Catalyst 4 | 168.7 | 154 | 142.3 | 138.2 | 138.5 |
| Catalyst 5 | 201 | 172.4 | 156.6 | 153.8 | 154.2 |

It can be seen from the results in Table 2 that, in contrast to the technical prejudice in the art, CO oxidation performance (as measured by CO T50) does not increase with an increase in total PGM loading of the catalyst. Rather, at multiple ageing conditions, Catalysts 2 and 3 (having a lower, NOx storage layer PGM loading of 70 and 52.6 g/ft$^3$ respectively), have superior CO oxidation performance than Catalyst 1, having a lower layer PGM loading of 90 g/ft$^3$.

It has therefore been surprisingly found that the catalysts described herein can achieve comparable or even improved catalytic performance relative to catalysts that have a higher NOx storage layer (and total) PGM loading. This "thrifting" of PGM is advantageous, as the same performance can be achieved with the use of lower levels of expensive PGMs.

The invention claimed is:

1. A lean NOx trap catalyst, comprising:
   a first layer for storing nitrogen oxides (NOx) under lean exhaust gas conditions and releasing and/or reducing stored NOx during rich exhaust gas conditions, said first layer comprising one or more platinum group metals, a NOx storage material, and a first inorganic oxide;
   a second layer disposed on the first layer, said second layer comprising a first zone for oxidizing carbon monoxide (CO) and/or hydrocarbons (HC), and a second zone for oxidizing nitric oxide (NO); and
   a substrate having an inlet end and an outlet end, wherein said first layer is in direct contact with the substrate;
   said first zone comprising one or more noble metals, a second inorganic oxide, and a zeolite;
   said second zone being substantially free of zeolite and comprising a support material and platinum, palladium, or a mixture or alloy of platinum and palladium;
   wherein the NOx storage material comprises ceria doped with at least one dopant selected from lanthanum, neodymium, or metal oxides thereof.

2. The lean NOx trap catalyst of claim 1, wherein the NOx storage material comprises ceria doped with neodymium or a metal oxide thereof.

3. The lean NOx trap catalyst of claim 1, wherein said one or more platinum group metals is a mixture or alloy of platinum and palladium.

4. The lean NOx trap catalyst of claim 1, wherein the first inorganic oxide is a refractory metal oxide selected from the group consisting of alumina, ceria, magnesia, silica, titania, zirconia, niobia, tantalum oxides, molybdenum oxides, tungsten oxides, and mixed oxides or composite oxides thereof.

5. The lean NOx trap catalyst of claim 1, wherein the one or more platinum group metals in the first layer are present in a loading of about 10 to about 110 g/ft$^3$.

6. The lean NOx trap catalyst of claim 1, wherein the one or more platinum group metals in the first layer are present in a loading of about 35 to about 90 g/ft$^3$.

7. The lean NOx trap catalyst of claim 1, wherein the second inorganic oxide comprises a refractory metal oxide selected from the group consisting of alumina, silica, titania, zirconia, ceria and a mixed or composite oxide of two or more thereof.

8. The lean NOx trap catalyst of claim 1, wherein the first zone further comprises an alkaline earth metal.

9. The lean NOx trap catalyst of claim 1, wherein the zeolite is selected from a small pore zeolite, a medium pore zeolite and a large pore zeolite.

10. The lean NOx trap catalyst according to claim 9, wherein the zeolite is a large pore zeolite that has a Framework Type that is BEA.

11. The lean NOx trap catalyst of claim 1, wherein the ratio of the loading in g/ft$^3$ of the one or more noble metals in the first zone to the loading in g/ft$^3$ of the one or more platinum group metals in the first layer is between about 1:1.5 and about 4:1.

12. The lean NOx trap catalyst of claim 1, wherein the ratio of the loading in g/ft$^3$ of the one or more noble metals in the first zone to the loading in g/ft$^3$ of the one or more platinum group metals in the first layer is between about 1.5:1 and about 1:0.8.

13. The lean NOx trap catalyst of claim 1, wherein the second zone comprises platinum.

14. The lean NOx trap catalyst of claim 1, wherein the support material comprises a refractory metal oxide selected from the group consisting of alumina; silica, titanic, zirconia, ceria and a mixed or composite oxide of two or more thereof.

15. The lean NOx trap catalyst of claim 1, wherein the first layer is deposited on the substrate having an inlet end and an outlet end, the first zone is deposited on the first layer, and the second zone is deposited on the first layer.

16. The lean NOx trap catalyst of claim 1, wherein the second zone is arranged to contact the exhaust gas at the outlet end of the substrate and after contact of the exhaust gas with the first zone and/or the first layer.

17. The lean NOx trap catalyst of claim 1, wherein the substrate is a flow-through monolith or a filter monolith.

18. The lean NOx trap catalyst of claim 1, wherein the first layer and/or second layer is extruded to form a flow-through or filter substrate.

19. The lean NOx trap catalyst of claim 1, wherein the one or more platinum group metals in the first layer are present in a loading of about 40 to about 75 g/ft$^3$.

20. The lean NOx trap catalyst of claim 1, wherein the one or more platinum group metals in the first layer are present in a loading of about 50 to about 70 g/ft$^3$.

21. The lean NOx trap catalyst of claim 1, wherein the first zone further comprises barium.

22. The lean NOx trap catalyst of claim 1, wherein the ratio of the loading in g/ft$^3$ of the one or more noble metals in the first zone to the loading in g/ft$^3$ of the one or more platinum group metals in the first layer is between about 1.33:1 and about 1:1.

23. An emission treatment system for treating a flow of a combustion exhaust gas comprising the lean NOx trap catalyst of claim 1 and an internal combustion engine.

24. The emission treatment system of claim 23, wherein the internal combustion engine is a diesel engine.

25. The emission treatment system of claim 23, further comprising a selective catalytic reduction catalyst system, a particulate filter, a selective catalytic reduction filter system, a passive NOx adsorber, a three-way catalyst system, or combinations thereof.

26. A method of treating an exhaust gas from an internal combustion engine comprising contacting the exhaust gas with the lean NOx trap catalyst of claim 1.

27. A method of treating an exhaust gas from an internal combustion engine by employing the emission treatment system of claim 23.

* * * * *